Figure 4:
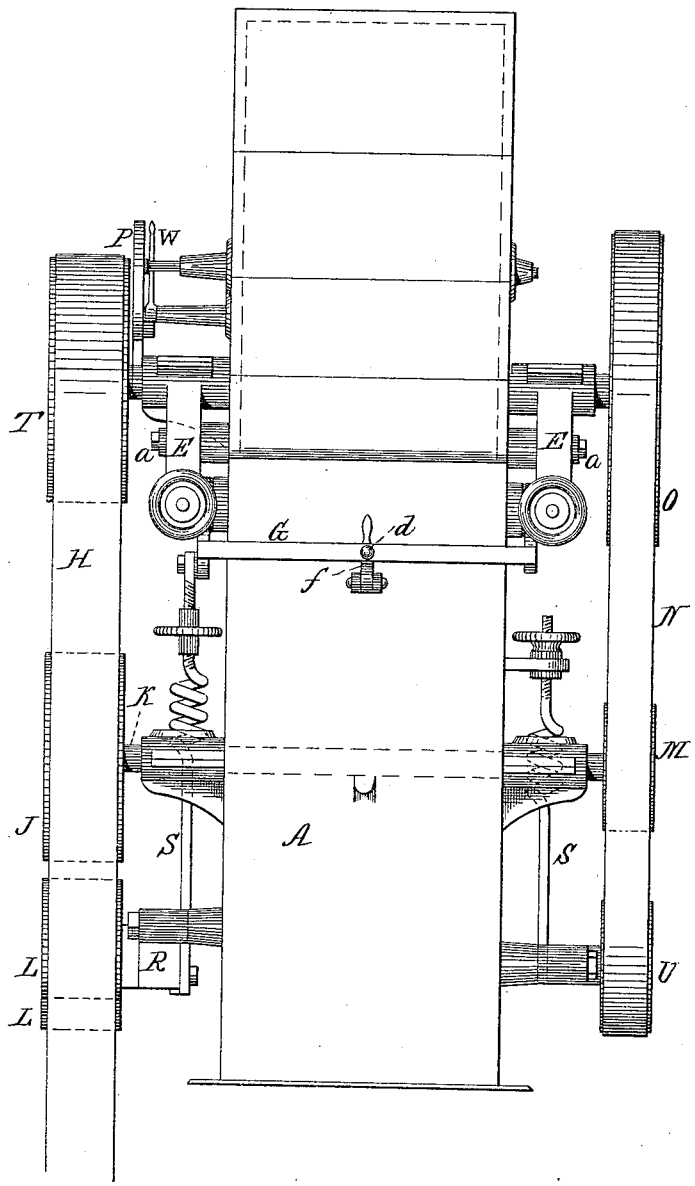

(No Model.) 16 Sheets—Sheet 1.
H. J. GILBERT.
ROLLER MILL.
No. 389,380. Patented Sept. 11, 1888.
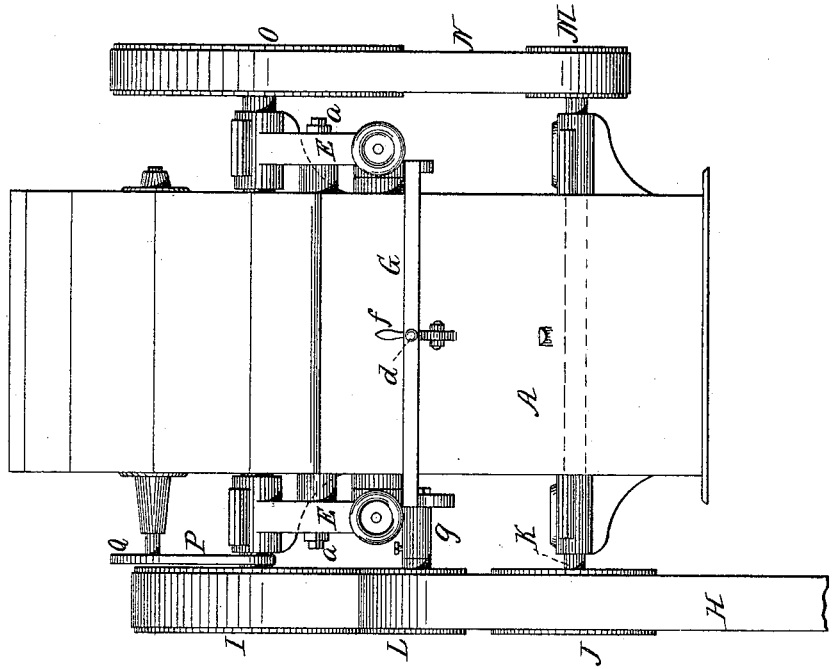
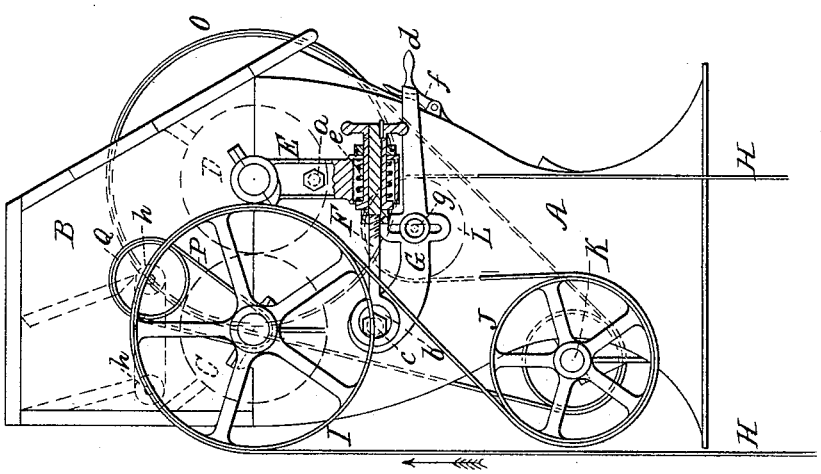
Witnesses:
W. C. Jirdinston.
Charles Billow.
Inventor:
Henry J. Gilbert,
by Peck & Rector,
his Attorneys.

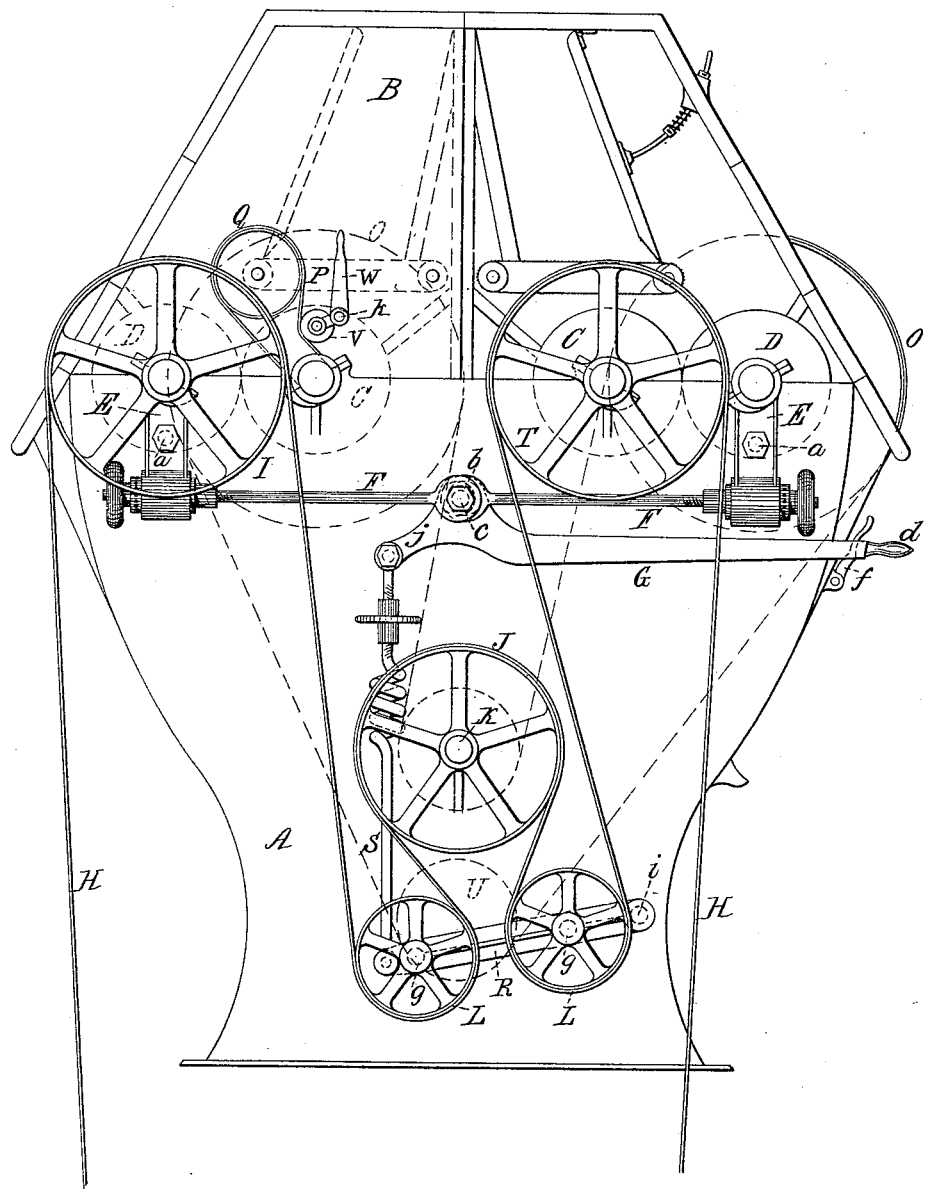

(No Model.)

H. J. GILBERT.
ROLLER MILL.

No. 389,380.   Patented Sept. 11, 1888.

16 Sheets—Sheet 3.

Witnesses:
W. C. Jirdinston.
Charles Billon,

Inventor:
Henry J. Gilbert,
by Peck & Rector
his Attorneys.

(No Model.) 16 Sheets—Sheet 6.

H. J. GILBERT.
ROLLER MILL.

No. 389,380. Patented Sept. 11, 1888.

Witnesses:
W. C. Firdinston.
Charles Billon,

Inventor:
Henry J. Gilbert,
by Peck & Rector.
his Attorneys.

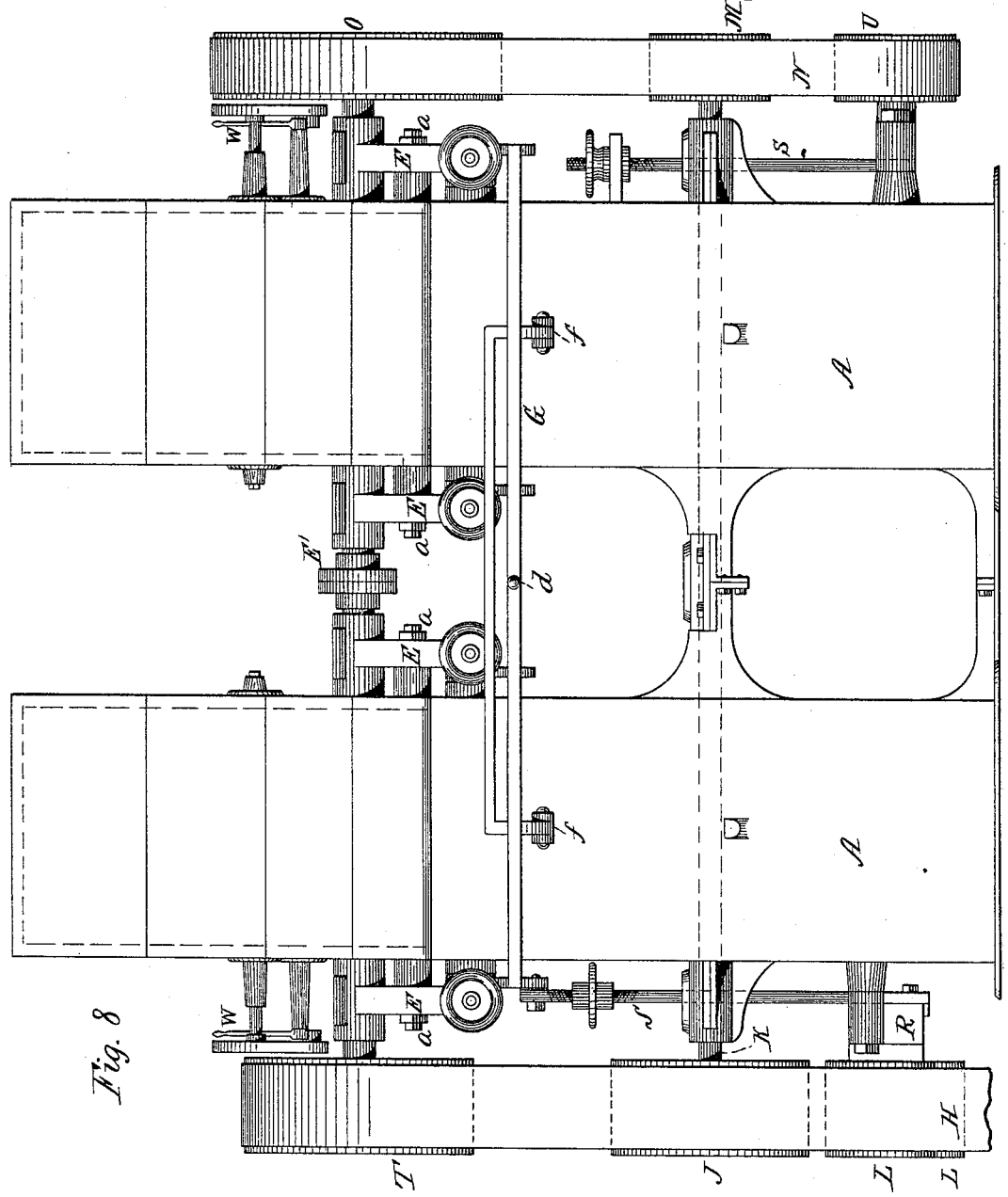

(No Model.) 16 Sheets—Sheet 8.
H. J. GILBERT.
ROLLER MILL.
No. 389,380. Patented Sept. 11, 1888.
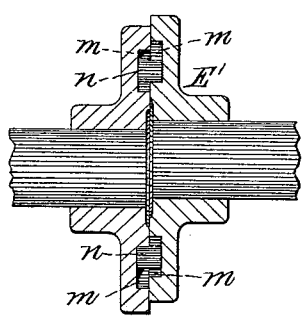
Fig. 14.
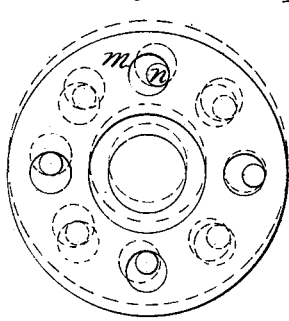
Fig. 15.
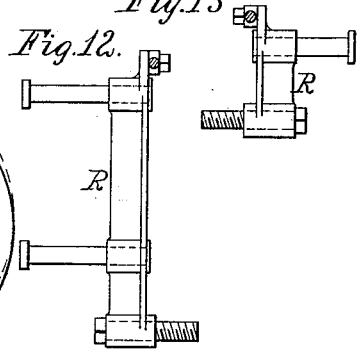
Fig. 13. Fig. 12.
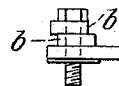
Fig. 10.
Fig. 11.
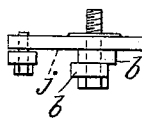
Fig. 9.
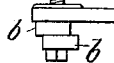
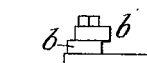
Witnesses:
W. C. Jirdinston.
Charles Billon.
Inventor:
Henry J. Gilbert,
by Peck & Reitor,
his Attorneys.

(No Model.)
H. J. GILBERT.
ROLLER MILL.
No. 389,380. Patented Sept. 11, 1888.
16 Sheets—Sheet 9.
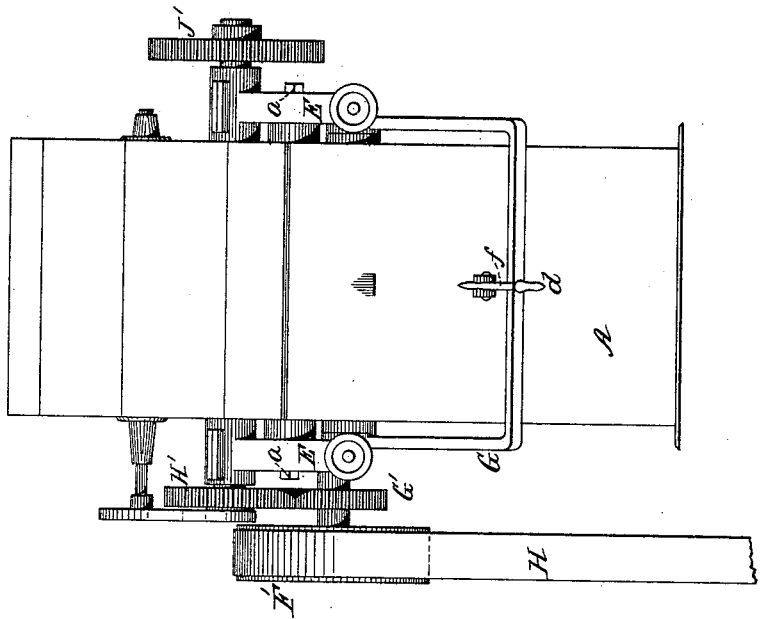
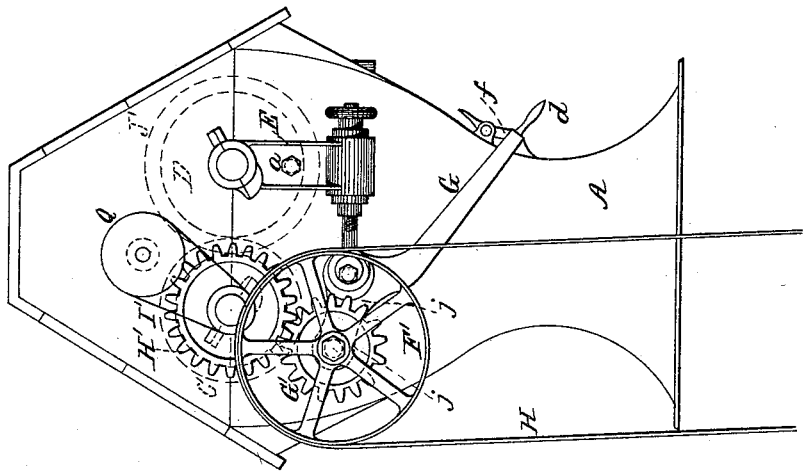
Witnesses:
W. C. Jirdinston.
Charles Billon.
Inventor:
Henry J. Gilbert.
by Peck & Rector
Attorneys.

(No Model.) 16 Sheets—Sheet 10.
H. J. GILBERT.
ROLLER MILL.
No. 389,380. Patented Sept. 11, 1888.
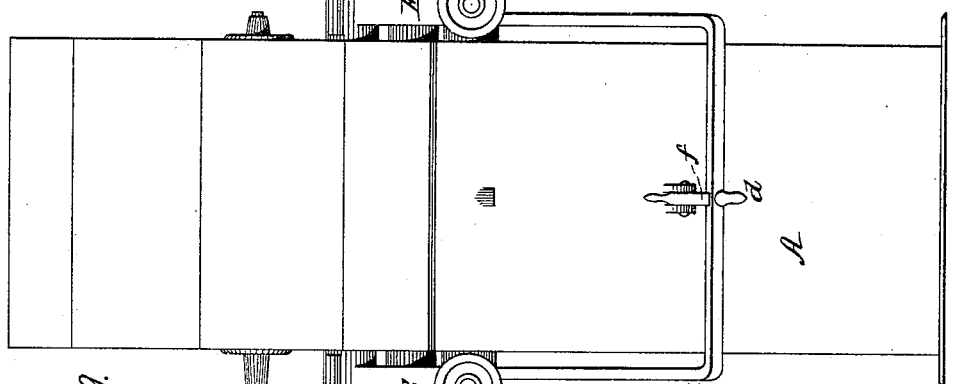
Fig. 19.
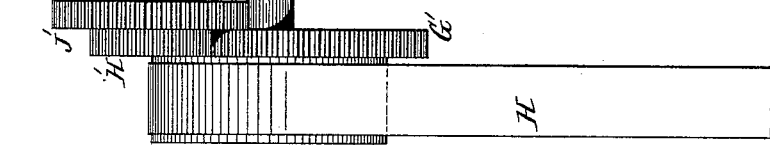
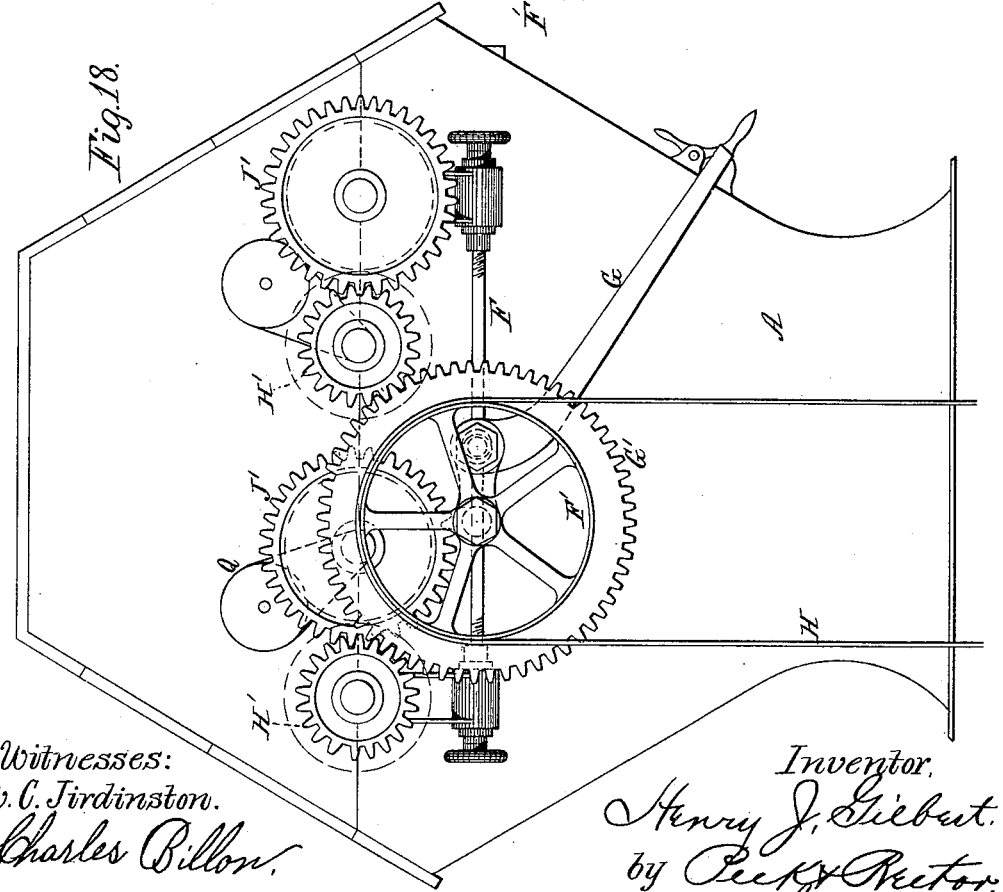
Fig. 18.
Witnesses:
W. C. Jirdinston.
Charles Billon.
Inventor,
Henry J. Gilbert.
by Peek & Rector,
Attorneys.

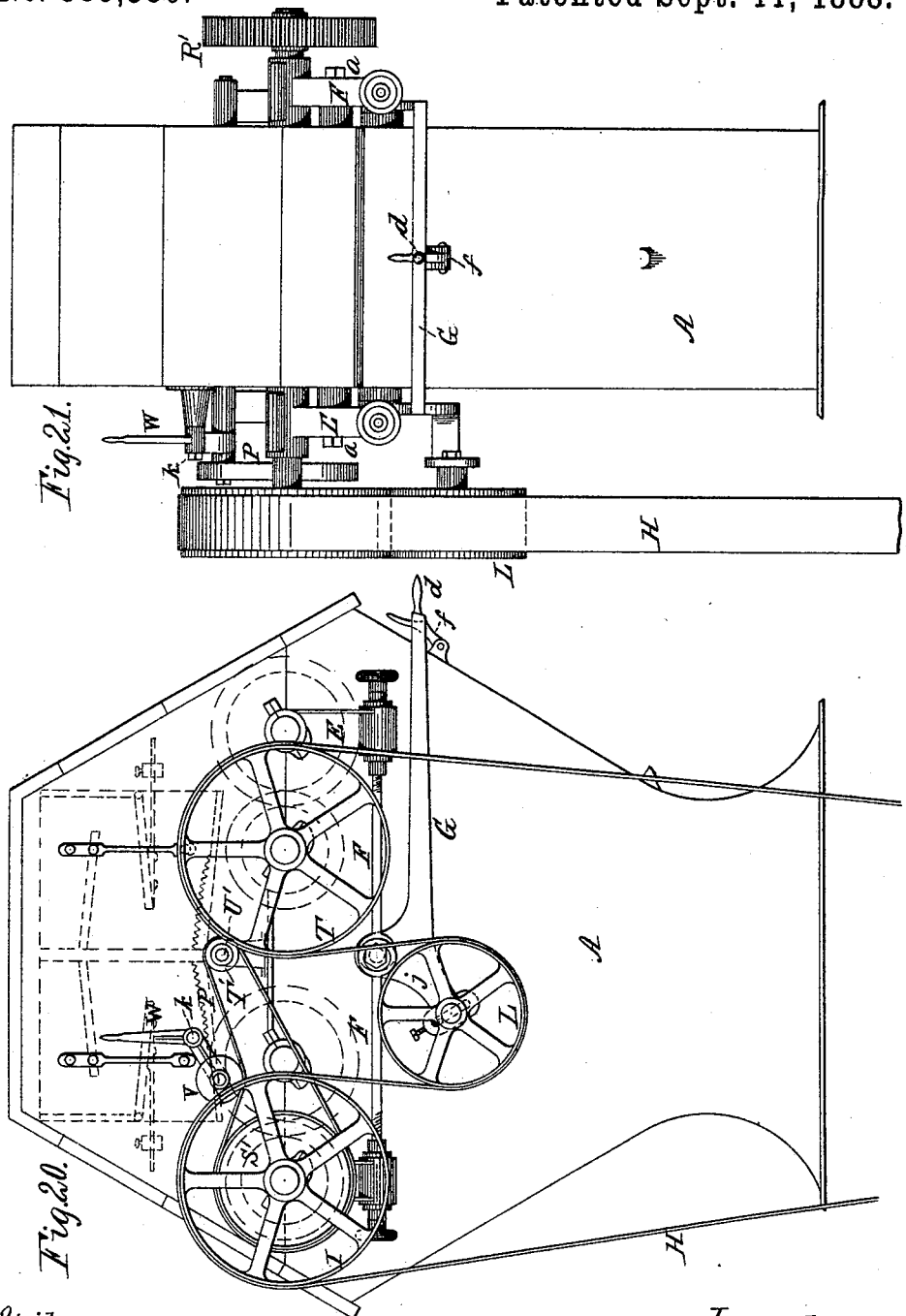

(No Model.)
16 Sheets—Sheet 12.
H. J. GILBERT.
ROLLER MILL.
No. 389,380. Patented Sept. 11, 1888.
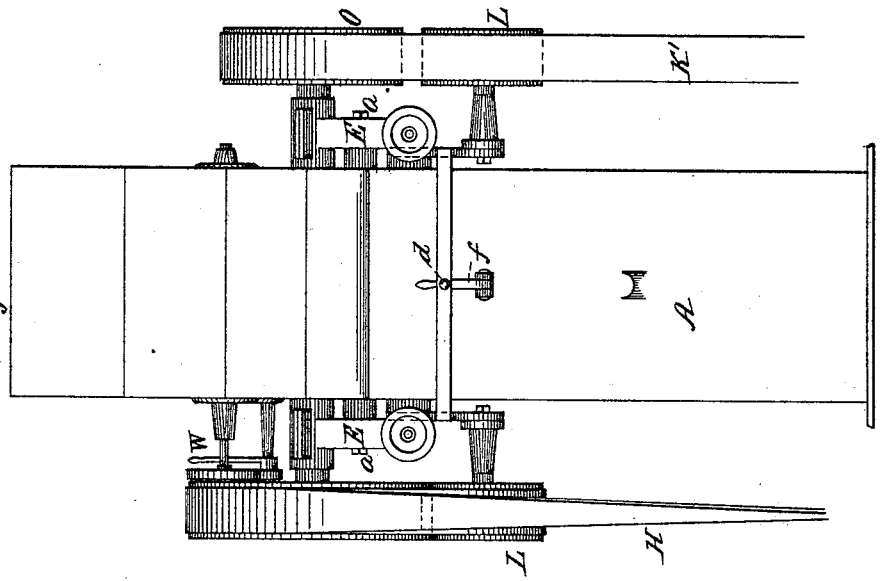
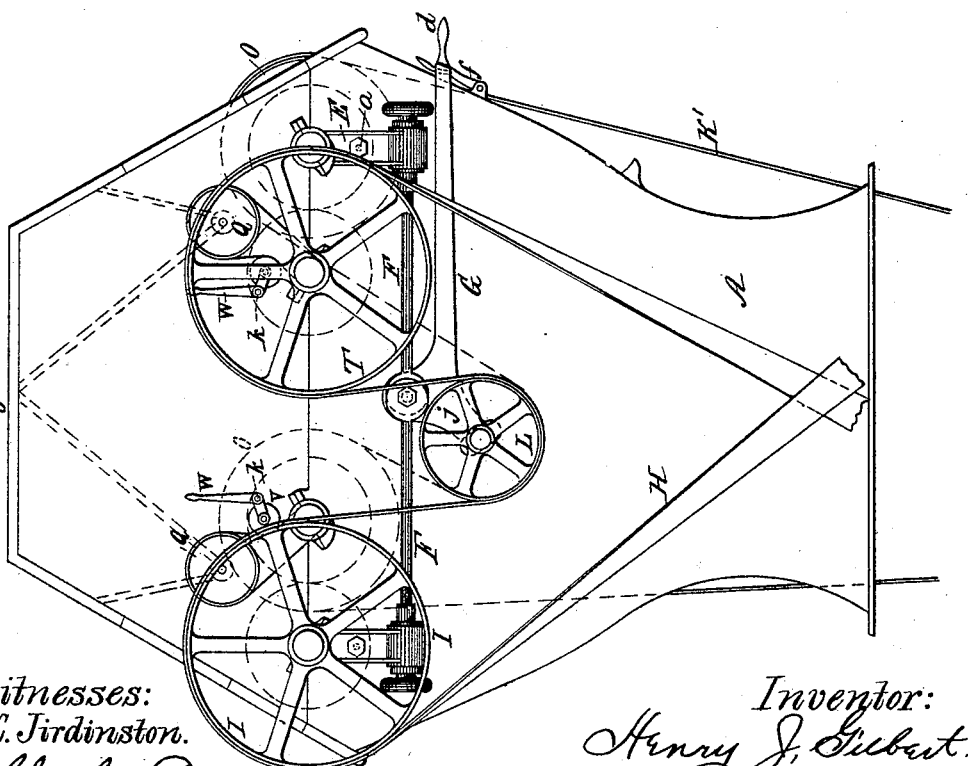
Witnesses:
W. C. Jirdinston.
Charles Billon.
Inventor:
Henry J. Gilbert.
by Peck & Rector,
his Attorneys.

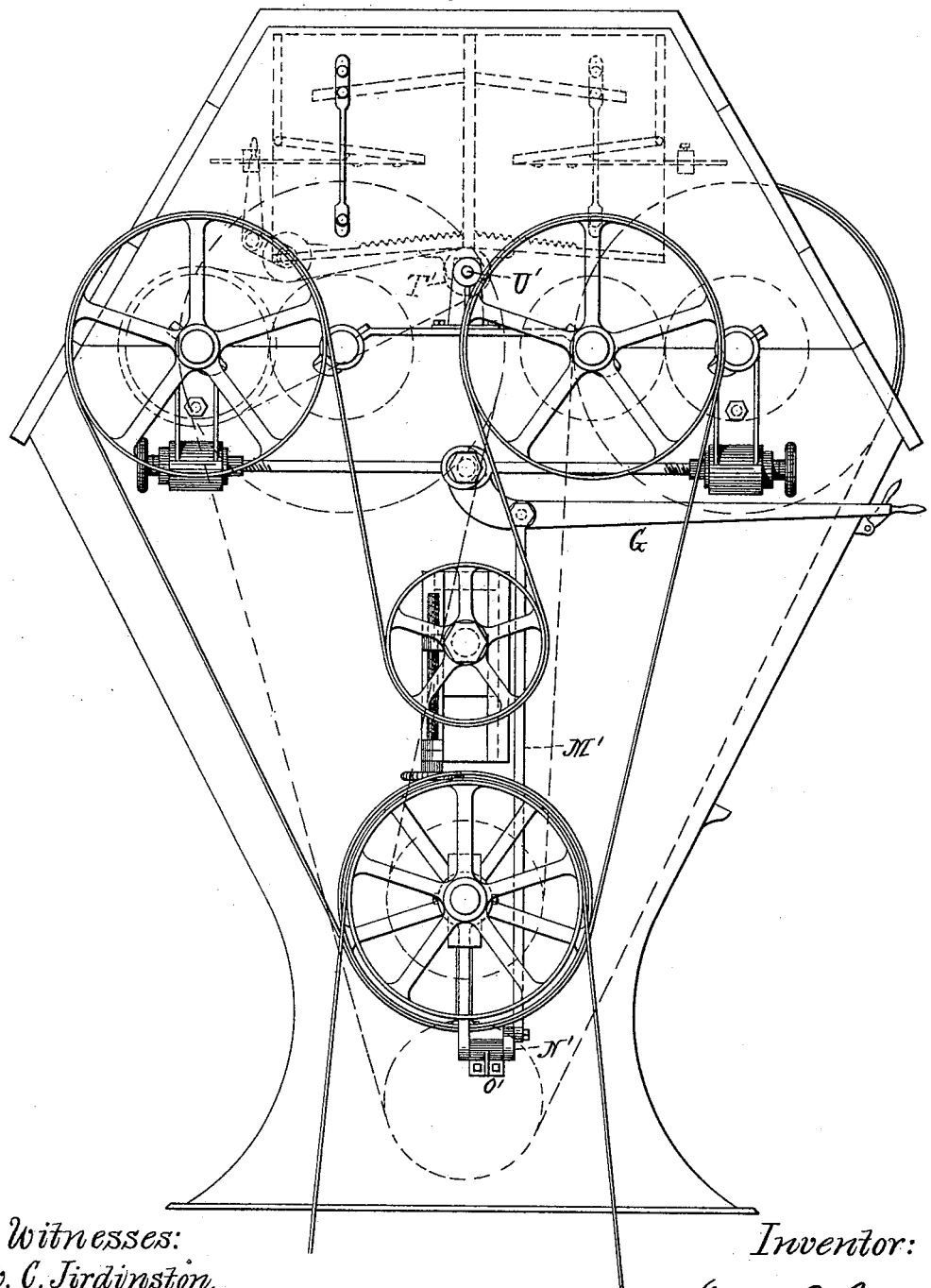

(No Model.)  16 Sheets—Sheet 14.
H. J. GILBERT.
ROLLER MILL.
No. 389,380.  Patented Sept. 11, 1888.
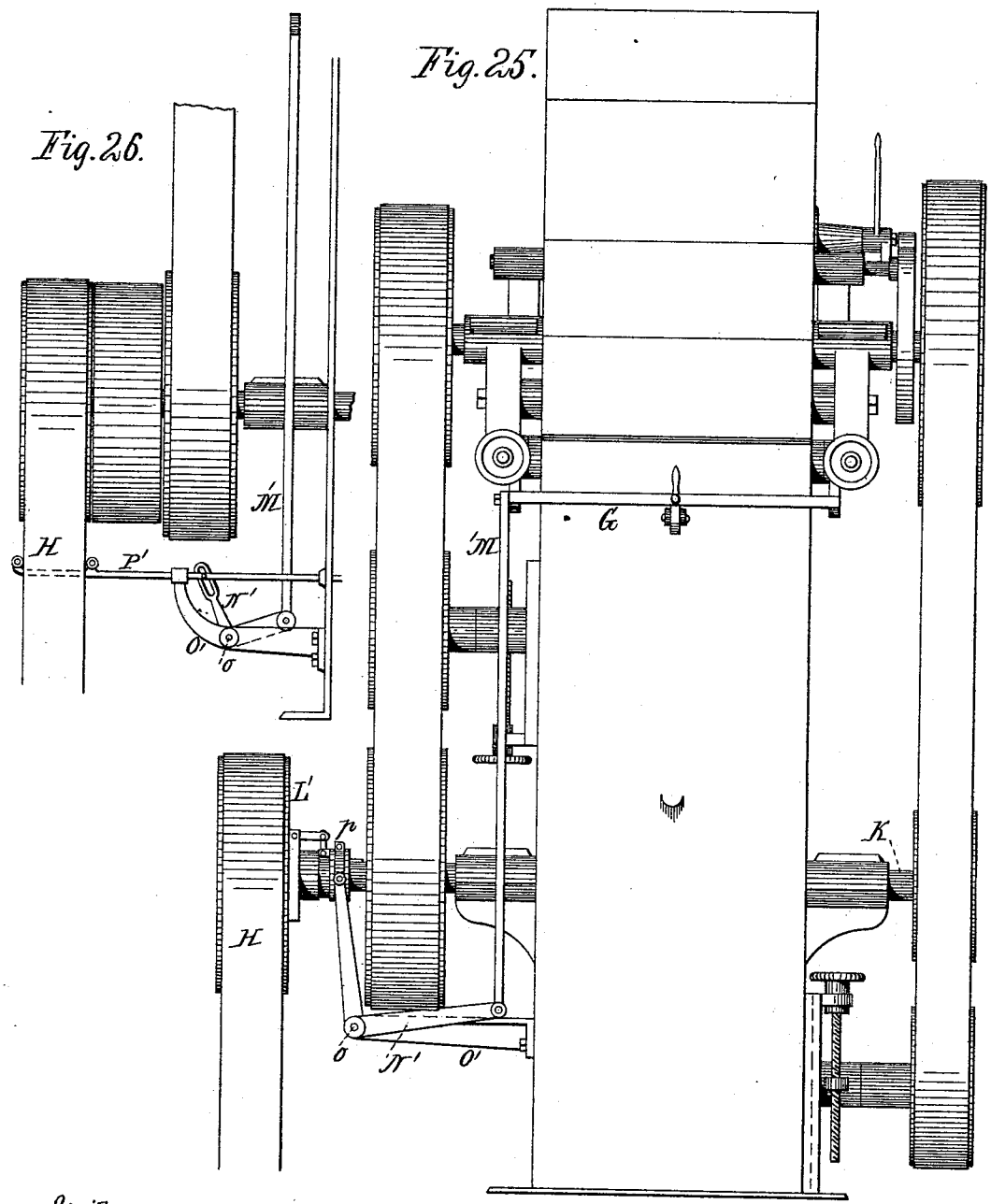
Witnesses:
W. C. Jirdinston.
Charles Billon,
Inventor:
Henry J. Gilbert,
by Peck & Rector,
his Attorneys.

(No Model.)

H. J. GILBERT.
ROLLER MILL.

No. 389,380. Patented Sept. 11, 1888.

Witnesses:
W. C. Jirdinston.
Charles Billon

Inventor:
Henry J. Gilbert.
by Peck & Rector,
his Attorneys.

(No Model.) 16 Sheets—Sheet 16.
H. J. GILBERT.
ROLLER MILL.
No. 389,380. Patented Sept. 11, 1888.
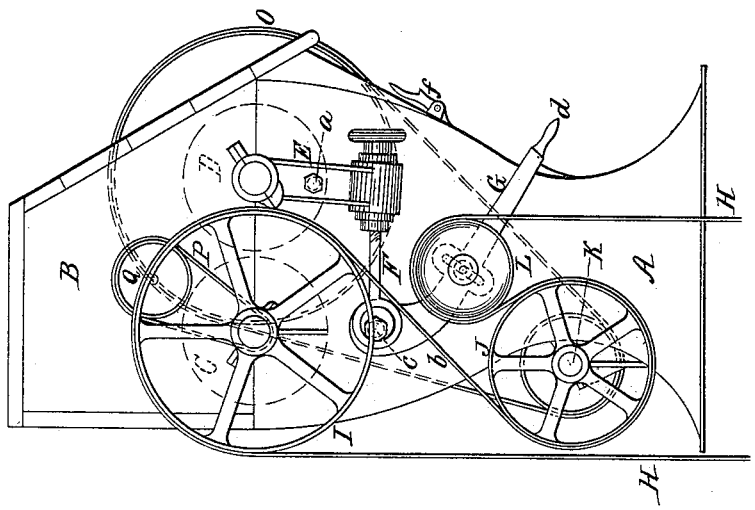
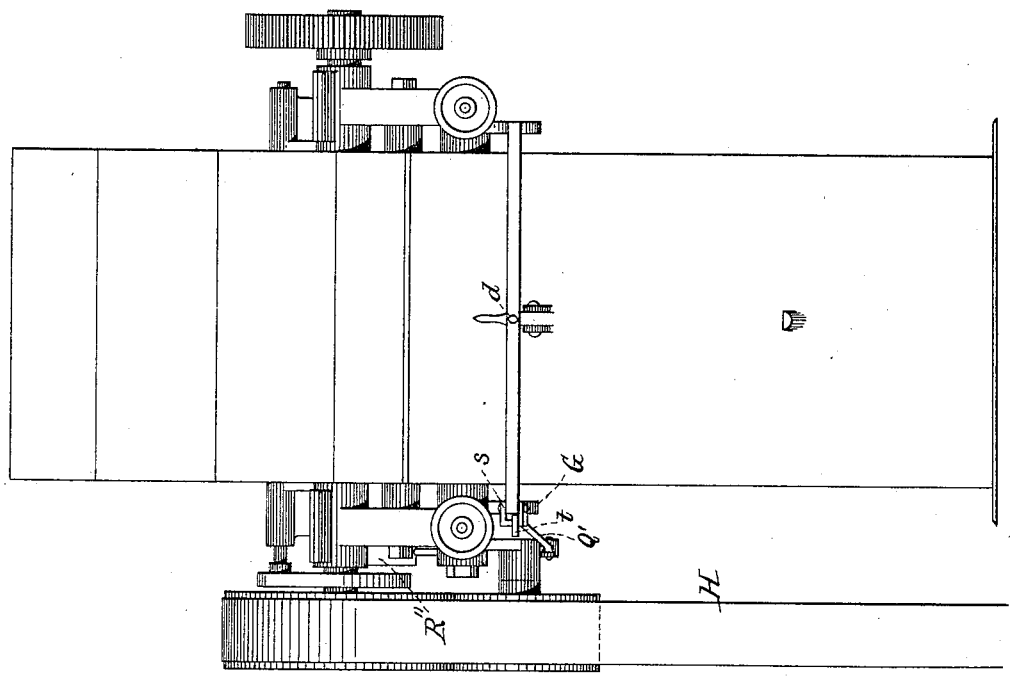
Witnesses:
W. C. Jirdinston.
Charles Billon.
Inventor:
Henry J. Gilbert,
by Peck & Rector,
his Attorneys.

UNITED STATES PATENT OFFICE.

HENRY J. GILBERT, OF DAYTON, OHIO.

ROLLER-MILL.

SPECIFICATION forming part of Letters Patent No. 389,380, dated September 11, 1888.

Application filed September 7, 1887. Serial No. 249,002. (No model.)

*To all whom it may concern:*

Be it known that I, HENRY J. GILBERT, a citizen of the United States, residing at Dayton, in the county of Montgomery and State of Ohio, have invented certain new and useful Improvements in Roller-Mills, of which the following is a full, clear, and exact description, reference being had to the accompanying drawings, forming part of this specification.

My invention relates to that class of roller-mills in which the grain or middlings is fed from a hopper to one or more pairs of differentially-running grinding or crushing rolls; and it has for its principal object an improvement in the construction of this class of machines, whereby a single lever movement throws the rolls into or out of working contact and at the same time starts or stops the machine.

Figure 5:
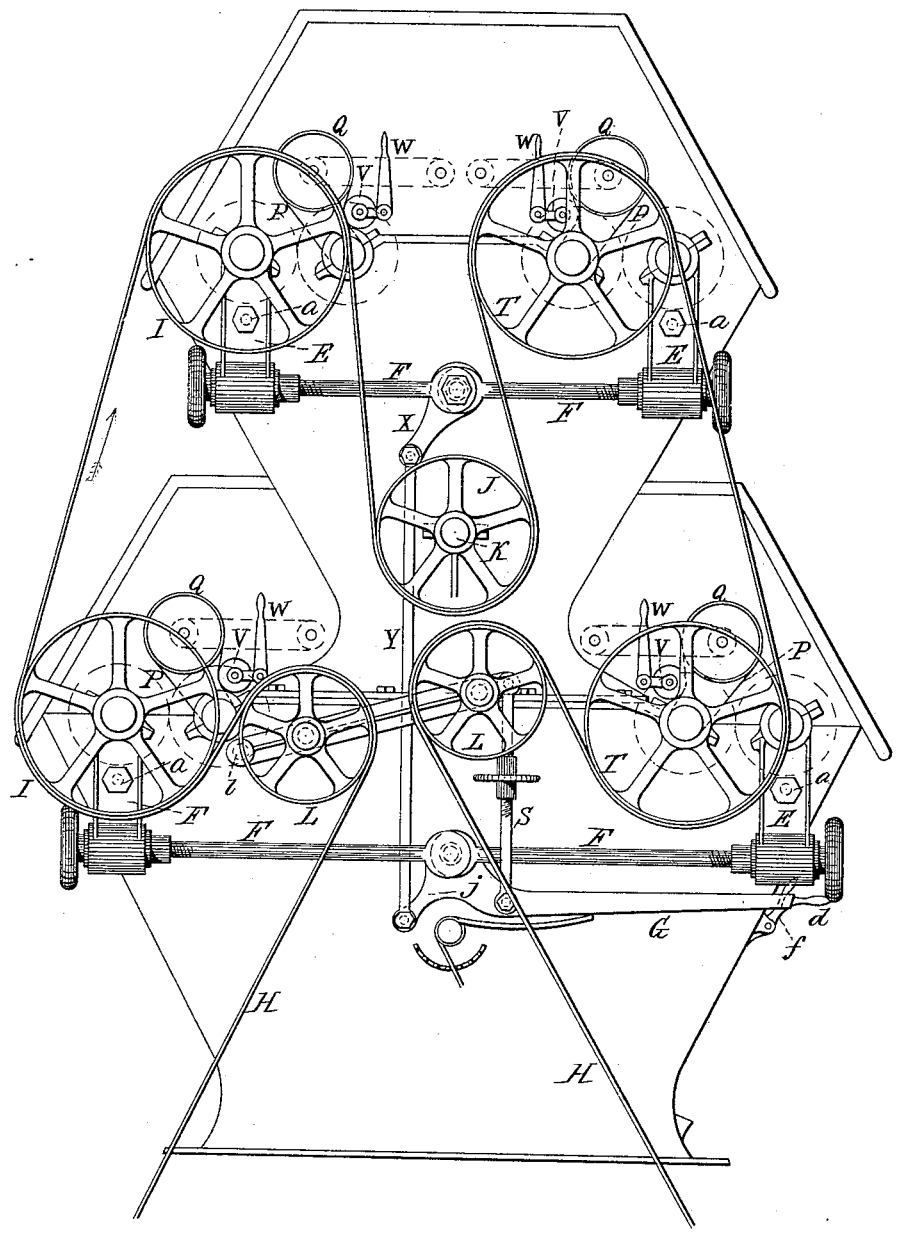
Figure 6:
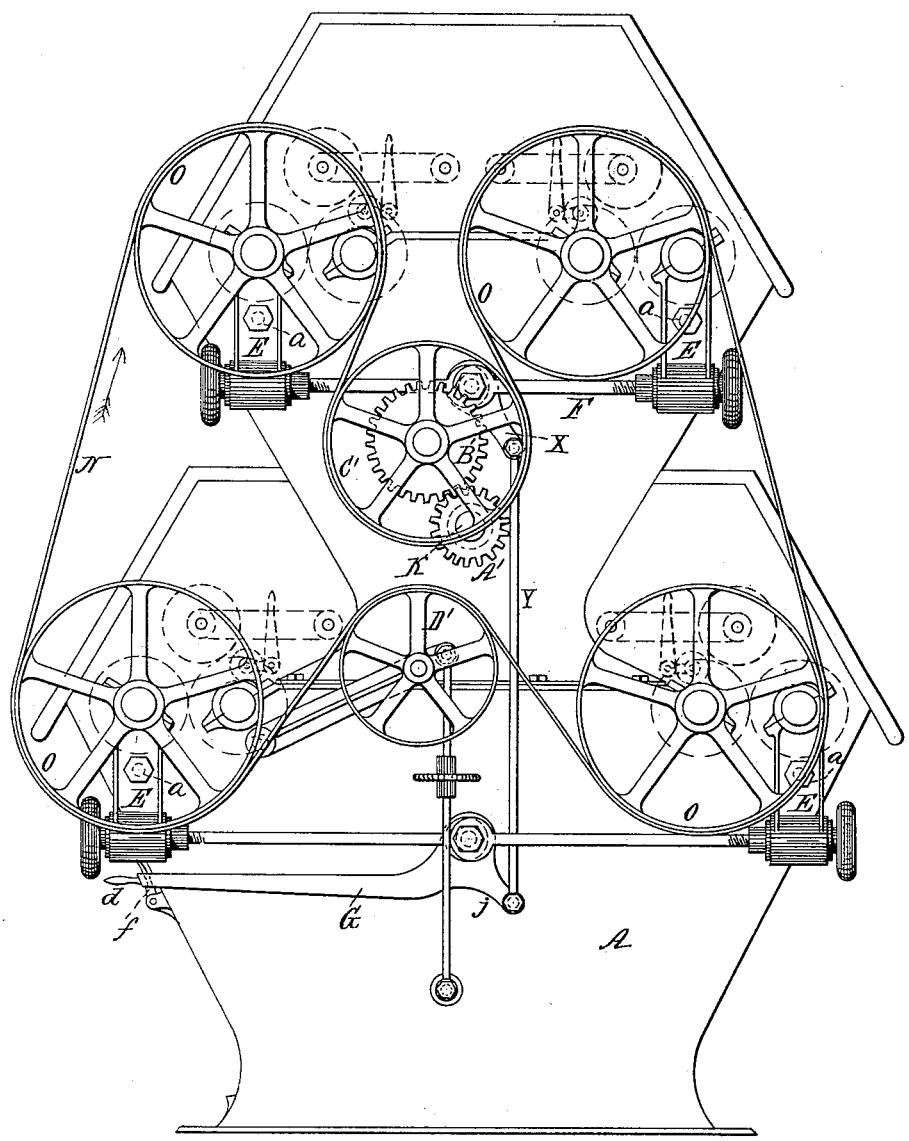
Figure 7:
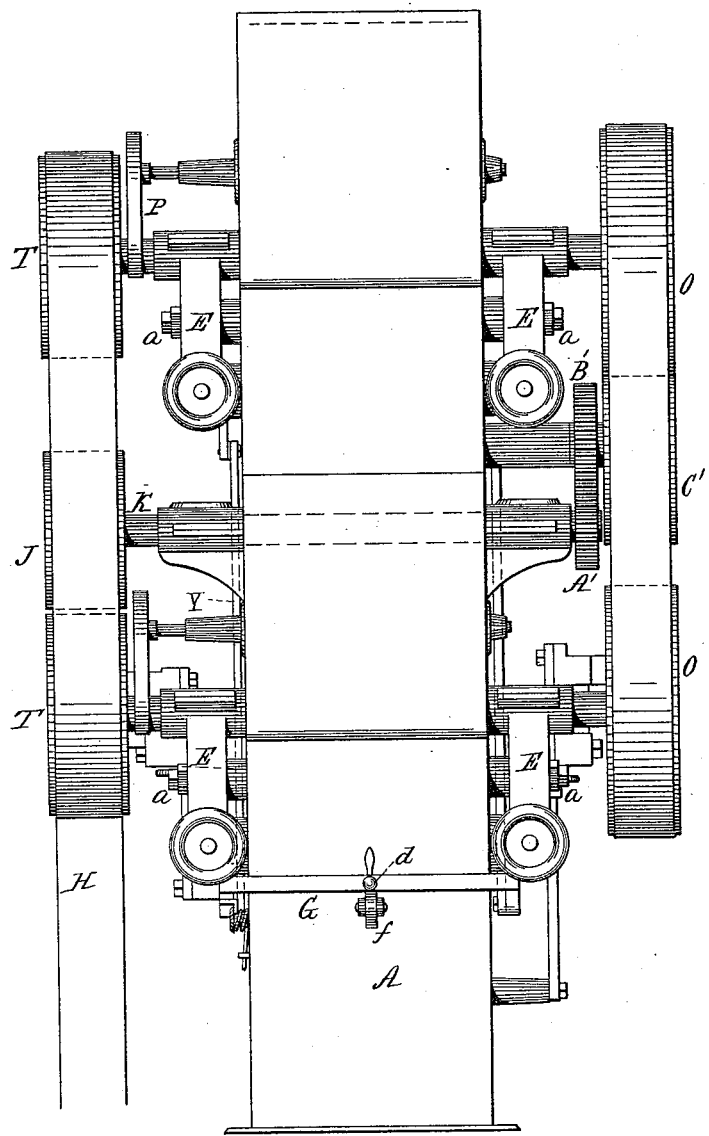
Figure 27:
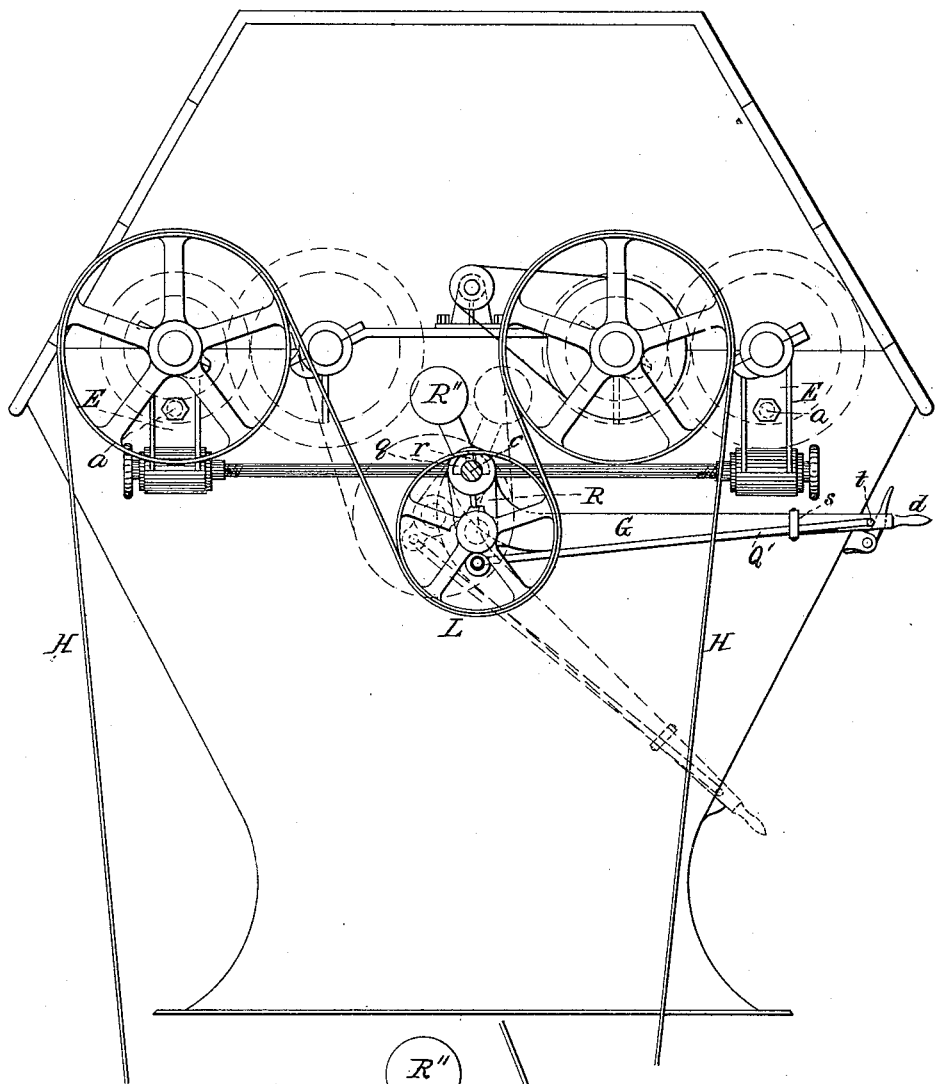
Figure 29:
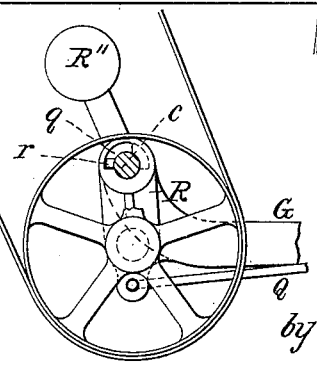

In the accompanying drawings, Figure 1 is a side elevation of a single-roller mill embodying my invention, the device for adjusting the adjustable roll being in section. Fig. 2 is an end elevation of the same. Fig. 3 is a side elevation of a double roller-mill embodying my invention and with one side of the hopper-frame removed. Fig. 4 is an end elevation of the mill shown in Fig. 3. Fig. 5 is a side elevation of an eight-roller mill embodying my invention. Fig. 6 is an opposite side elevation of the mill shown in Fig. 5. Fig. 7 is an end elevation of the mill shown in Figs. 5 and 6. Fig. 8 is an end elevation of two connected mills, side by side, and showing the application of my invention. Figs. 9, 10, and 11 are detached plan views of the operating-levers for the different styles of mills illustrated. Figs. 12 and 13 are detached plan views of the swinging carriers for the tightening-pulleys. Fig. 14 is an enlarged sectional elevation of the adjustable coupling. Fig. 15 is an inside face view of the same. Fig. 16 is a side elevation of a single-geared mill embodying my invention. Fig. 17 is an end elevation of the mill shown in Fig. 16. Fig. 18 is a side elevation of a double-geared mill embodying my invention. Fig. 19 is an end elevation of the mill shown in Fig. 18. Fig. 20 is a side elevation of a double mill embodying my invention, with a single-belt drive. Fig. 21 is an end elevation of the mill shown in Fig. 20. Fig. 22 is a side elevation of a double mill embodying my invention, with a double-belt drive. Fig. 23 is an end elevation of the mill shown in Fig. 22. Fig. 24 is a side elevation of a double mill embodying my invention and representing a modification in the means for stopping the machine. Fig. 25 is an end elevation of the mill shown in Fig. 24. Fig. 26 represents a detail, to be referred to in the specification. Fig. 27 is a side elevation of a double roller-mill embodying my invention and representing a modification in the means for stopping and starting the machine. Fig. 28 is an end elevation of the machine shown in Fig. 27. Fig. 29 is a detail view, to be referred to in the specification. Fig. 30 is a side elevation of the mill shown in Fig. 1, with the lever down, the rolls spread apart, and the machine stopped.

The same letters of reference are used to indicate indentical parts in all the figures.

In Figs. 1 and 2, representing a single mill, as well as in all the figures, A represents the frame-work, of the usual or any suitable construction; B, the hopper-casing; C, the stationary roll, and D the adjustable roll. The shaft of the adjustable roll is journaled in swinging arms E, pivoted, as at $a$, to the frame of the machine. The lower ends of the arms E are connected by rods F to eccentrics $b$, secured upon a lever, G, which, pivoted, as at $c$, on each side of the machine, extends outward and across the end of the frame, and may be provided with any suitable grasping-handle, $d$. The rods F are connected to the swinging arms E by the usual or any suitable spring-connections, $e$. The lever G is held up by any suitable catch, $f$, and in this position the parts are so adjusted that the rolls are in working contact.

The machine shown in Figs. 1 and 2 is organized as a single-belt drive, the belt H extending from a pulley on the line-shaft below the machine up over the pulley I upon the shaft of the roll C, thence down around a pulley, J, on a counter-shaft, K, journaled in and extending across the frame, thence up and around a tightener-pulley, L, upon a spindle, $g$, secured to and, if desired, adjustable in the side of the lever G. The opposite end of the counter-shaft K is provided with a pulley, M, from which a belt, N, extends up and around the pulley O, upon the shaft of the roll D. A small belt, P, extends from the shaft of the roll C, up around a pulley, Q, upon the shaft of the feed-roller, which may be of the usual or any suitable construction, or may be, as seen in Fig. 1, an endless apron upon two rollers, h, journaled across the bottom of the hopper, and upon one of which the pulley Q is secured; or, as seen in Figs. 20 and 24, it may be a shaker-feed. It results from this construction and the adjustment of the parts that when the lever G is up and the rolls are in working contact, the belt H is tight and the machine is driven and at work. Upon releasing the lever G and dropping it down, as shown in Fig. 30, the pulley L is lowered, the belt H slackened, so as to at once stop the machine, and the roll D, by the turning of the eccentrics b, is thrown away from the roll C. Thus by the single operation of the lever G the entire machine is stopped and the rolls spread apart. By lifting up the lever G the belt H is tightened, the machine started, and the rolls brought into working contact, as will be readily understood.

The application of my invention to a double mill is shown in Figs. 3 and 4, where the lever G carries on each side double eccentrics b, with which the eyes of the rods F engage, and which eccentrics are so set that the dropping of the lever G will draw in both of the rods F simultaneously to spread the rolls of both pairs.

Instead of having a single tightener-pulley, L, secured to the lever G, I provide two tighteners, L, which are secured upon spindles attached to a frame, R, which is pivoted to the side of the machine, as at i. The opposite end of the frame R is connected by an adjustable pivoted link, S, to an extension, j, of the lever G, and the belt H, in leaving the pulley I, passes down first under the nearest tightener-pulley L, thence up around the pulley J, thence down around the other tightener-pulley L, thence up around the pulley T of the roll C, thence down to the pulley on the line-shaft. The belt N on the other side of the machine is driven by the pulley M on the counter-shaft and extends up from said pulley over the two pulleys O, and thence down around a pulley, U, as indicated by the dotted lines in Fig. 3.

In the machine just described it will be seen that the dropping of the lever G will cause the upward swinging of the frame R through the medium of the link S and the raising of the tightener-pulleys L, thereby slackening the belt H and stopping the machine simultaneously with the spreading of the rolls.

It will be understood that the stopping of the machine immediately stops the feed whether the apron-feed I have described is used or the ordinary roll-feed shown in dotted lines in Fig. 22 or the shaker-feed shown in Figs. 20 and 24; but for the purpose of stopping the feed upon either side of the machine at any time without stopping the machine or spreading the rolls I provide small tightener-pulleys V, which are carried upon bell-crank levers W, pivoted, as at k, to the hopper-casing, as seen in Figs. 3, 4, 5, and 6. By swinging these levers in one direction the belts P will be slacked and the feed stopped entirely independent of the other operations of the machine, and by swinging them in the opposite direction into their normal position the belts P will be tightened and the feed started.

The application of my invention to mills having sets of rolls in double banks, one above the other, will be seen by reference to Figs. 5, 6, and 7, where the adjustable rolls of each pair of a bank are connected to eccentrics by swinging arms E and rods F, the lowermost pairs of which rolls are connected to the lever G, as before described, and those above for each higher bank to eccentrics secured to crank-arms X, pivoted to the sides of the frame. The extension j of the lever G on each side is connected to each of the crank-arms X above by rod or link Y, so that the vibration of the lever G imparts a simultaneous vibration to all of the crank-arms, thus causing a simultaneous drawing in or throwing out of the rods F to spread all of the rolls or draw them into working contact. The frame R is in this instance pivoted, as at l, above the lever G, and is connected to the same at its free end by the link S at a point between the eccentrics and the outer end of the lever G. The belt H in this instance first passes up over the left idler-pulley, Fig. 5, thence down around the pulley I of the lower bank, thence up over the pulley I of the upper bank, thence down around the pulley J of the counter-shaft, thence up around the pulley T of the upper bank, thence down around the pulley T of the lower bank, thence around the right-hand tightener-pulley L and back to the driving-pulley on the line-shaft. On the opposite side of the machine, Fig. 6, the counter-shaft K is provided with a pinion, A', meshing with a pinion, B', on a spindle provided with a pulley, C'. By means of the intermeshing pinions A' B' the proper direction is given to the adjustable rolls of both banks, for the belt N, passing under the pulley C', extends up over the pulleys O of the upper bank, thence down around the pulleys O of the lower bank, and up over an adjustable tightener-pulley, D', which may be independently adjusted by any suitable means to tighten the belt N.

The application of my invention to mills placed side by side is represented in Figs. 8, 11, 14, and 15. In Fig. 8 two mills are shown side by side, though this number might be increased, and the lever G extends across the ends of both of them, with side extensions for each, as seen in Fig. 11. The roll-shafts have common axes as nearly as possible, and their extended abutting inner ends are provided with clutch-disks E' whose inner faces in contact with each other are provided with recesses m, in this instance circular, and each containing a roller, n, smaller than the bores of said recesses, so as to afford a universally-adjustable coupling to enable the axes of a pair of rolls to be coupled together, although they may not be in exact line with each other. The mills shown in Fig. 8 are otherwise of the same construction as that illustrated in Figs. 3 and 4, excepting that the springs in the links S have been omitted. It will be seen from this construction that both mills will be stopped and the rolls spread, or vice versa, by the operation of the lever G.

The application of my invention to a single-geared mill is shown in Figs. 16 and 17, where the adjustment of the eccentrics is such that the lever G is down when the rolls are in working contact and the machine running, and the lifting of said lever spreads the rolls and stops the machine. The pulley F', over which the driving-belt H passes, is carried upon a sleeve revolving on a spindle projecting from the extension j of the lever G, and which sleeve has secured upon it a pinion, G', meshing with a pinion, H', upon the shaft of the roll C. The opposite end of said shaft is provided with a pinion, I', (shown in dotted lines in Fig. 16,) which meshes with a pinion, J', upon the shaft of the roll D. The lifting of the lever G while spreading the rolls at the same time disengages the pinion G' from the pinion H' and stops the machine.

The application of my invention to a double-geared mill is shown in Figs. 18 and 19, where the gearing is all on one side of the machine. The pinion G' is made sufficiently large to mesh with the pinions H' of both pairs of rolls, and these pinions H' are sufficiently wide to mesh with the pinions J' of each pair of rolls. The raising of the lever G in this instance simultaneously disengages all the pinions in the spreading of the rolls and the dropping of the pinion G'.

In Figs. 20 and 21 I have illustrated the application of my invention to a single-belt-drive double mill, differing in its details of arrangement from the construction illustrated and described in Figs. 3 and 4.

In Figs. 20 and 21 the tightener-pulley L is carried adjustably, if desired, upon the extension j of the lever G. The belt H passes up around the pulley I, thence down around the tightener L, thence up around the pulley T, and thence back to the pulley upon the line shaft. On the opposite side of the machine each pair of rolls is geared together by pinions R', as seen in Fig. 21. By lowering the lever G to spread the rolls the pulley L is raised to slacken the belt and stop the machine. The reverse motion of the lever G brings the rolls into working contact and tightens the belt H, thereby starting the machine.

In Fig. 20, and also in Fig. 24, I have shown the belt P extending from a pulley, S', upon the shaft of the pulley I, around a pulley, T', upon a tappet-shaft, U', extending through the hopper, and by means of which the usual or any suitable shaker-feed mechanism (shown in dotted lines) is operated.

Figs. 22 and 23 represent the application of my invention to a double mill with driving-belts on each side. Here each side extension of the lever G is provided with the projection j, carrying a tightener-pulley, L, and the belt H, extending up over the pulleys I and T and down around the tightener L, is crossed on one side of the machine to give proper direction to the revolution of the rolls, while the belt K' on the opposite side passes up around the pulleys O and down around the tightener L on that side of the machine without being crossed. The dropping of the lever G raises the tighteners L on both sides of the machine, simultaneously slackening both the belts H and K' and stopping the machine.

Another modification in the application of my invention is shown in Figs. 24, 25, and 26, where two belts are employed—one on each side of the machine—and a third driving-belt running over a clutch-pulley, L', upon the counter-shaft K. In this instance a pivoted link, M', connects the lever G with a bell-crank lever, N', pivoted, as at o, to a bracket, O', the upper end of which bell-crank lever is forked and engages with the shifter p of the clutch mechanism, which may be of the usual or any suitable construction for engaging the pulley L' and counter-shaft K. The adjustment of the parts is such that the dropping of the lever G disengages the clutch mechanism and frees the pulley L' to stop the machine at the same time the rolls are spread, and vice versa.

Instead of clutch mechanism a tight and loose pulley may be employed, as seen in Fig. 26, in which case the bell-crank N' is connected to a sliding shifter, P', to shift the belt from the tight to the loose pulley when the lever G is dropped and back again when it is raised.

While in the machines I have thus far shown and described the construction and operation of the lever mechanism is such that a single lever movement in one direction simultaneously spreads the rolls and stops the machine, and a single lever movement in the opposite direction simultaneously starts the machine and draws the rolls into working contact, it will be understood that a large part of the advantages of my invention may be obtained by the use of a lever mechanism which will cause the simultaneous spreading of the rolls and stopping of the machine by a single lever movement, but which will not accomplish the other function of starting the machine and drawing the rolls together by a single lever movement. It will also be understood that a lever mechanism may be advantageously used which will cause the simultaneous starting of the machine and drawing together of the rolls by a single lever movement, but which will not spread the rolls and stop the machine by a single lever movement.

In Figs. 27 and 28 I have illustrated a machine provided with a lever mechanism which will stop the machine and spread the rolls simultaneously by a single lever movement, but will not start the machine and draw the rolls together by a single lever movement. In this case the idler-frame R is journaled upon the stud c, and its hub is provided with a segmental slot, q, as shown. A lug, r, extending from the outer adjacent eccentric fits into this slot and bears against the upper end wall thereof when the lever G is up, the rolls in working contact, and the machine running. A pull-bar, Q', suitably secured in this instance by means of a clip, s, to the side extension of the lever G, has its rear end connected to the frame R and its forward end provided with any suitable grasping-handle, t. R'' is any suitable weight upon an arm extending from the upper part of the frame R. It will be seen from this construction that when the lever G is dropped to the position indicated by the dotted lines the rolls will be spread, as before explained, and the lug r in turning will vibrate the frame R with its pulley L to the position indicated by the dotted lines, thereby slackening the belt and stopping the machine. The lifting of the lever G, however, will only draw the rolls into working contact, and the frame R will remain in the position indicated by the dotted lines until the pull-bar Q' is drawn out, whereupon it will be swung back to position indicated by the solid lines to tighten the belt and start the machine. The weight R'' is intended as a counterpoise to hold the frame R and its pulley L in either of their adjusted positions.

By changing the position of the lug r, as seen in Fig. 29, so that it bears against the lower end wall of the slot q when the rolls are together and the machine running, it will be readily seen that by dropping the lever G the rolls will be spread, but the frame R and its pulley L will not be moved. To then stop the machine requires a second movement, which consists in pushing back the bar Q' to swing up the frame R and pulley L and slacken the belt. This will bring the end wall of the slot q up against the lug r, and upon then lifting the lever G the rolls will be brought together and the frame R vibrated back to tighten the belt and start the machine, as will be readily understood.

In the construction and operation of this class of machines it has heretofore been the practice, when it was desired for any purpose to stop the grinding or crushing operation of the machine, either to merely stop the feed and spread the rolls, (sometimes simultaneously by a single lever movement and sometimes by separate devices,) or else to spread the rolls and stop the entire machine by separate devices and movements. In the former case, while the feed was stopped and the rolls were spread, the machine was allowed to continue running, and in the latter case, while the rolls were spread and the entire machine stopped, this was accomplished by separate movements and devices.

From the above description of my invention it will be seen that whenever it is desired to stop the grinding or crushing operation of the machine the rolls are spread and the entire machine is stopped simultaneously by a single lever movement, and all wear and tear on the parts is avoided while the grinding or crushing operation is not going on.

Another advantage of my invention is derived from the fact that in stopping the entire series of machines in a mill, as at night, the whole work of spreading the rolls, shutting off the feed, and stopping the operation of each machine is accomplished by a single movement of the lever, thus enabling the miller to pass rapidly from one machine to another to stop the operation of the entire series. A similar advantage is derived in starting the series in beginning work, and where a number of machines placed side by side are connected together and operated by a single lever, as heretofore described, the labor is of course still further reduced.

It will be understood that in machines provided with a single through-shaft carrying the eccentrics for operating the rods F the lever G need not extend around the frame of the machine, but can be applied to the through-shaft on that side of the machine on which the tightener-pulley is situated.

While I have illustrated and described the application of my invention to a number of different styles of machines, it is evident that there are others to which it may be applied with the same advantage.

I am aware that it is old to construct roller-mills with lever mechanism connected to the adjustable roll and the belt which drives the feed-roll for the purpose of simultaneously spreading the rolls and stopping the feed, and vice versa, and I am also aware that it is old to provide roller-mills with lever mechanism connected to the adjustable roll and to a drive-chain which communicates motion from one roll to the other for the purpose of slackening the chain while suddenly shifting one roll from the other to permit any hard substance to pass between them.

Having thus fully described my invention, I claim—

1. In a roller-mill, the combination, with the fixed roll and the adjustable roll and the main driving mechanism, of a lever controlling said driving mechanism and connected to said adjustable roll, substantially as described, whereby a single movement of said lever simultaneously stops the machine and spreads the rolls.

2. In a roller-mill, the combination, with the fixed roll and the adjustable roll and the main driving mechanism, of a lever controlling said driving mechanism and connected to said adjustable roll, substantially as described, whereby a single movement of said lever simultaneously starts the machine and brings the rolls into working contact.

3. In a roller-mill, the combination, with the fixed roll and the adjustable roll and the main driving mechanism, of a lever controlling said driving mechanism and connected to said adjustable roll, substantially as described, whereby a single movement of said lever in one direction simultaneously stops the machine and spreads the rolls, and a single movement of said lever in the opposite direction simultaneously starts the machine and brings the rolls into working contact.

4. In a roller-mill having two or more sets of rolls in pairs, the combination, with the fixed roll and the adjustable roll of each pair and the main driving mechanism, of a lever controlling said driving mechanism and connected to the adjustable roll of each pair, substantially as described, whereby a single movement of said lever simultaneously stops the machine and spreads each pair of rolls.

5. In a roller-mill having two or more sets of rolls in pairs, the combination, with the fixed roll and the adjustable roll of each pair and the main driving mechanism, of a lever controlling said driving mechanism and connected to the adjustable roll of each pair, substantially as described, whereby a single movement of said lever simultaneously starts the machine and brings the rolls of each pair into working contact.

6. In a roller-mill having two or more sets of rolls in pairs, the combination, with the fixed roll and the adjustable roll of each pair and the main driving mechanism, of a lever controlling said driving mechanism and connected to the adjustable roll of each pair, substantially as described, whereby a single movement of said lever in one direction simultaneously stops the machine and spreads each pair of rolls, and a single movement of said lever in the opposite direction simultaneously starts the machine and brings the rolls of each pair into working contact.

7. In a roller-mill, the combination, with the fixed roll and the adjustable roll and the main driving-belt, of a tightener-pulley engaging with said driving-belt, and a lever connected to said tightener-pulley and to the adjustable roll, substantially as described, whereby a single movement of said lever simultaneously spreads the rolls and loosens the driving-belt to stop the machine.

8. In a roller-mill, the combination, with the fixed roll and the adjustable roll and the main driving-belt, of a tightener-pulley engaging with said driving-belt, and a lever connected to said tightener-pulley and to the adjustable roll, substantially as described, whereby a single movement of said lever simultaneously brings the rolls into working contact and tightens the driving-belt to start the machine.

9. In a roller-mill, the combination, with the fixed roll and the adjustable roll and the main driving-belt, of a tightener-pulley engaging with said driving-belt, and a lever connected to said tightener-pulley and to the adjustable roll, substantially as described, whereby a single movement of the said lever in one direction simultaneously spreads the rolls and loosens the driving-belt to stop the machine, and a single movement of said lever in the opposite direction simultaneously brings the rolls into working contact and tightens the driving-belt to start the machine.

10. In a roller-mill, the combination, with the fixed roll, the adjustable roll, and the main driving mechanism, of devices, substantially as described, between the driving mechanism and mill for causing their connection or disconnection, and a lever connected to the adjustable roll and actuating said devices when moved in one direction, whereby they will be operated simultaneously when the adjustable roll is moved, substantially as described.

11. In a roller-mill, the combination, with the fixed roll, the adjustable roll, and the main driving mechanism, of devices, substantially as described, between the driving mechanism and mill for causing their disconnection, and a lever connected to the adjustable roll and actuating said devices when the rolls are spread, substantially as described.

12. In a roller-mill, the combination, with the fixed roll, the adjustable roll, and the main driving mechanism, of devices, substantially as described, between the driving mechanism and mill for causing their connection and disconnection, and a lever connected to the adjustable roll and actuating said devices when moved in both directions, whereby a movement in one direction will spread the rolls and stop the mill, and when in the other direction brings the rolls into working contact and starts the machine, substantially as described.

13. In a roller-mill having two or more sets of rolls in pairs, the combination, with the fixed roll and the adjustable roll of each pair and the main driving mechanism, of devices, substantially as described, between the driving mechanism and mill for causing their connection and disconnection, and a lever connected to the adjustable roll and actuating said devices when moved in one direction, whereby they will be operated simultaneously when the adjustable rolls are moved, substantially as described.

14. In a roller-mill having two or more sets of rolls in pairs, the combination, with the fixed roll and adjustable roll of each pair and the main driving mechanism, of devices, substantially as described, between the driving mechanism and mill for causing their disconnection, and a lever connected to the adjustable rolls and actuating said devices when the rolls are spread, substantially as described.

15. In a roller-mill having two or more sets of rolls in pairs, the combination, with the fixed roll and adjustable roll of each pair and the main driving mechanism, of devices, substantially as described, between the driving mechanism and mill for causing their connection and disconnection, and a lever connected to the adjustable rolls and actuating said devices when moved in both directions, whereby when the rolls are spread, the mill will be disconnected, and when they are moved into working contact it will be connected, substantially as described.

HENRY J. GILBERT.

Witnesses:
 WARREN MUNGER,
 WM. H. YOUNG.